United States Patent [19]

Vandiver

[11] Patent Number: 5,011,075

[45] Date of Patent: Apr. 30, 1991

[54] VARIABLE FLOW VALVE

[76] Inventor: Robert L. Vandiver, 9 Murifield Dr., Siloam Springs, Ark. 72761

[21] Appl. No.: 468,244

[22] Filed: Jan. 22, 1990

[51] Int. Cl.$^5$ ............................................. G05D 23/10
[52] U.S. Cl. .................... 236/48 R; 138/45; 236/93 R; 251/117
[58] Field of Search ............ 236/48 R, 93 R; 138/45; 137/513.3, 535; 251/117, 337

[56] References Cited

U.S. PATENT DOCUMENTS

| | | | |
|---|---|---|---|
| 2,214,459 | 9/1940 | Gottlieb | 137/535 |
| 2,613,874 | 10/1952 | Thomas | 236/93 R X |
| 2,647,017 | 7/1953 | Coulliette | 236/93 R X |
| 3,853,268 | 12/1974 | Schneider | 236/48 R |
| 4,060,158 | 11/1927 | Kikuchi | 236/48 R X |
| 4,278,083 | 7/1981 | Young et al. | 251/117 X |
| 4,860,795 | 8/1989 | Oten | 138/45 X |

Primary Examiner—William E. Tapolcal
Attorney, Agent, or Firm—Charles S. McGuire

[57] ABSTRACT

A fluid flow control device primarily intended for throttling the flow of liquid refrigerant between two flow rates. The device includes a disc which moves between two distinct positions with a snap action in response to changes in temperature of the refrigerant. The disc is connected at its center to a stem member having an axial bore aligned with and of smaller cross-sectional area than the outlet passage of a flow chamber wherein the disc and stem are positioned. When refrigerant temperature increases to a predetermined level, the disc moves the stem into contact with the chamber wall surrounding the outlet orifice, thereby limiting refrigerant flow to that which passes through the relatively smaller bore of the stem member. When refrigerant temperature drops sufficiently, the disc snaps back to the other position, moving the end of the stem away from the outlet orifice to permit flow at a higher rate. A pre-tensioning arm is also provided for placing a biasing force on the disc in one position thereof to control more precisely the temperature at which it moves to the other position.

10 Claims, 1 Drawing Sheet

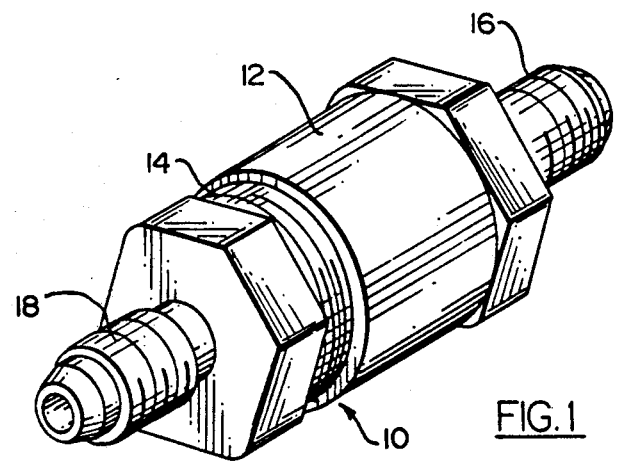
FIG. 1
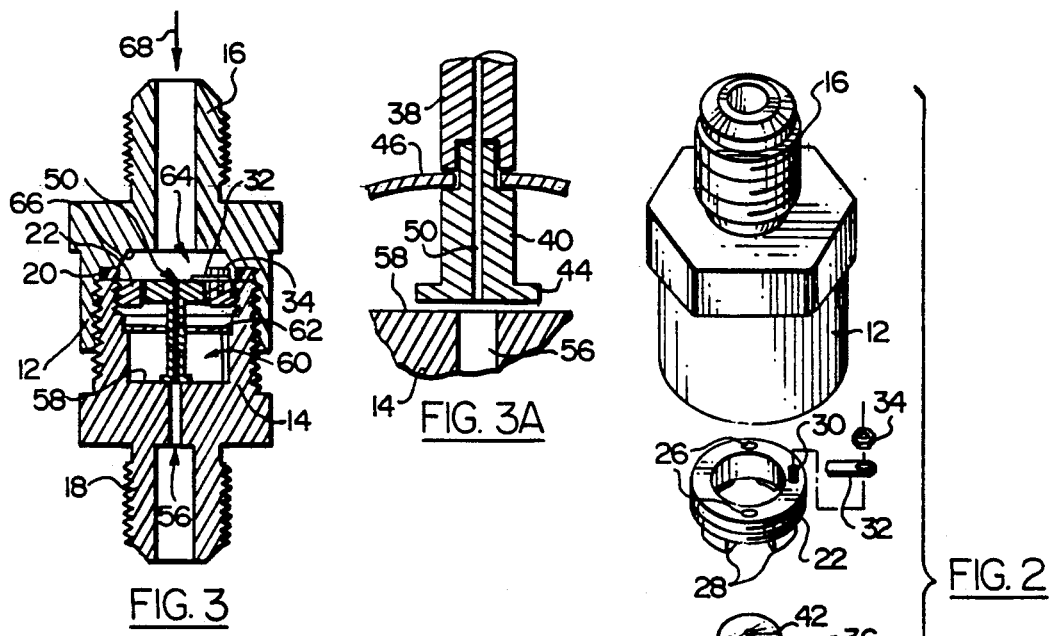
FIG. 3
FIG. 3A
FIG. 2
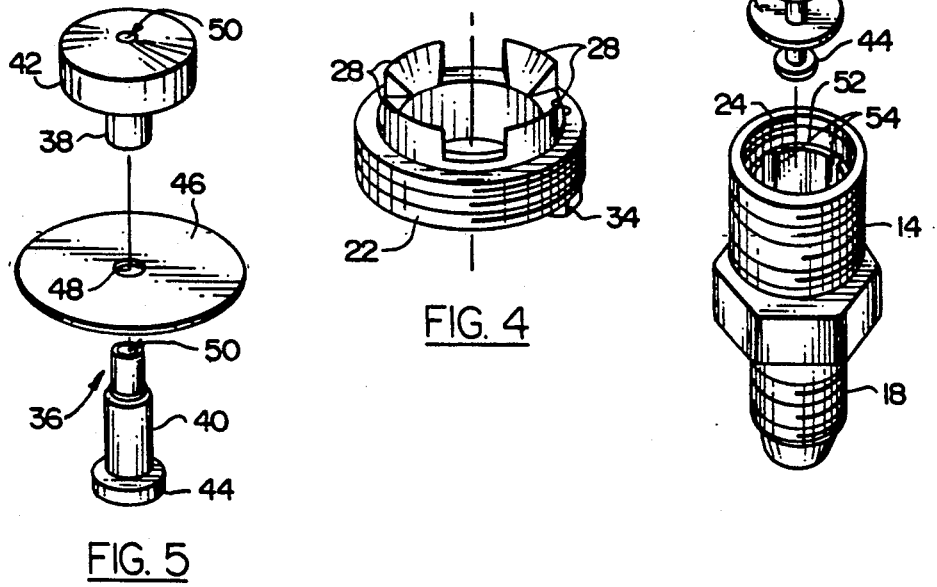
FIG. 5
FIG. 4

VARIABLE FLOW VALVE

BACKGROUND OF THE INVENTION

The present invention relates to fluid flow control devices, and is particularly directed to thermally responsive valves useful in modulating the flow of refrigerant in heat pump and air conditioning applications.

In a refrigeration cycle wherein refrigerant flow to the evaporator coil is metered by a fixed orifice, there is no modulation of flow with load variations. It is sometimes desirable to decrease the rate of flow of liquid refrigerant to the evaporator coil in order to reduce power requirements and consequently improve efficiency of the system.

The present invention is directed to providing a simple and inexpensive device which operates automatically to modulate refrigerant flow in a refrigeration cycle in a novel and improved manner.

A further object of the invention is to provide a refrigerant throttling device which operates automatically in response to changes in the temperature of refrigerant flowing therethrough.

Another object is to provide a device which may be easily and quickly installed in a refrigerant flow line, and which includes a flow throttling element movable between first and second positions in response to variations above and below a predetermined level of the temperature of liquid refrigerant flowing therethrough.

Other objects will in part be obvious and will in part appear hereinafter.

SUMMARY OF THE INVENTION

The device of the invention includes a body formed by two parts threadedly engaged to one another and each having a threaded end portion for connection to the refrigerant line. The assembled parts of the body cooperate to form an enclosed, sealed chamber having a cylindrical side wall with a reduced diameter portion forming a stepped shoulder, and a flat end wall with a central orifice of predetermined, fixed diameter.

A stem member having relatively large and small diameter flanges on its opposite ends is formed in two sections which are fixedly joined to hold therebetween the central portion of a thin, circular, metal disc. A passageway of smaller diameter than the predetermined diameter of the orifice in the end wall of the chamber passes axially through the stem member. The metal disc is retained about its outer periphery between the stepped shoulder of the chamber wall and portions of an annular retainer member which is secured in the chamber by engagement with an internally threaded portion of the chamber side wall.

The metal disc is in the nature of a temperature-responsive Bellville spring, i.e., an element which snaps between two distinct positions or configurations when pressure is applied and removed at the center. In this case, the pressure is provided by thermal expansion and contraction of the disc due to changes in temperature of liquid refrigerant flowing through the device. Since the disc is retained in a fixed position at its outer periphery, the central portion moves between the two positions and transmits the motion to the stem member. In one position, the smaller diameter flange is biased into firm contact with the end wall of the chamber, and in the other position it is spaced a short distance from the end wall. The passageway through the stem member is in axial alignment with the opening in the end wall in both positions. A clearance is provided between the larger diameter flange and the surrounding portion of the retainer member to permit refrigerant to flow into the chamber around the stem member above the metal disc. Grooves in the side wall of the chamber permit flow of refrigerant into the space around the stem member below the disc.

When the stem member is positioned with the smaller diameter flange in contact with the chamber end wall, refrigerant passing through the device must flow through the passageway in the stem member, and the flow rate is limited by the diameter of the passageway. When the smaller diameter flange is spaced from the end wall, refrigerant may flow through the orifice in the end wall both from the passageway in the stem member and from the space within the chamber around the stem member. The flow rate is then metered by the size of the end wall orifice. Thus, two distinct flow rates are provided by the device in accordance with refrigerant temperature.

The foregoing and other features of the invention will be more readily understood and appreciated from the following detailed description, taken in conjunction with the accompanying drawing, wherein:

BRIEF DESCRIPTION OF THE DRAWING

FIG. 1 is a perspective view of an exemplary embodiment of the device of the invention in fully assembled condition;

FIG. 2 is an exploded perspective view showing all elements of the device of FIG. 1;

FIG. 3 is an elevational view of the device in vertical full section;

FIG. 3a is an enlarged, fragmentary, elevational view showing certain elements of FIG. 3 in an alternate position;

FIG. 4 is a perspective view of one of the elements of the device; and

FIG. 5 is an exploded perspective view of other elements.

DETAILED DESCRIPTION

Referring now to the drawings, in FIG. 1 is seen the device of the invention denoted generally by reference numeral 10, having a body comprising upper and lower portions 12 and 14, respectively. The terms upper and lower, and the like, are used for convenience to describe the device and individual elements thereof as shown in FIGS. 2 and 3, and not necessarily in a particular orientation when in use. Body portions 12 and 14 are generally cylindrical, each including a section providing flats for wrench engagement during assembly and disassembly of internally threaded upper portion 12 with externally threaded lower portion 14. Externally threaded nipples 16 and 18 extend integrally from portions 12 and 14, respectively, for connection of device 10 in a refrigerant flow line of an air conditioning or heat pump system.

When body portions 12 and 14 are fully engaged they cooperate to form an enclosed chamber, sealed by gasket 20 (FIG. 3), divided into separate portions by elements within the chamber, as described later. Annular retainer element 22 is externally threaded for engagement with internal threads 24 in the upper part of lower body portion 14. Openings 26 in the upper surface of retainer element 22 are provided for engagement by a spanner wrench. Spaced protrusions 28, having cylindrical outer surfaces and tapered inner surfaces, extend downwardly from the annular portion of retainer element 22, shown in an inverted position in FIG. 4. Threaded stud 30 is engaged in a threaded opening in the upper surface of retainer element 22 and arm 32 is retained on stud 30 by small nut 34, for purposes explained later.

A stem element, shown separately in FIG. 5 and denoted generally by reference numeral 36, is provided by two axially mating sections 38 and 40. Relatively larger and smaller diameter collars or flanges 42 and 44 are integrally formed on sections 38 and 40, and are positioned at the upper and lower ends, respectively, of stem element 36. Metal disc 46 has central opening 48 through which a smaller diameter portion of stem section 40 passes to retain disc 46 firmly between the two sections of stem element 36, which are joined to one another by threaded or force fit. When so assembled, passageway 50 extends continuously and axially through stem element 36.

The elements are assembled by placing stem element 36 within lower body portion 14, threading retainer element 22 into engagement with threads 24, and securely threading body portions 12 and 14 together. In the assembled condition, the outer periphery of metal disc 46 rests on stepped shoulder 52 (FIG. 2) at the top of a reduced diameter portion of the cylindrical side wall of the enclosed chamber, and is retained between the shoulder and protrusions 28 on retainer element 22. A plurality of spaced grooves 54, two of which are seen in FIG. 2, extend into the reduced diameter portion of the chamber side wall. Larger diameter flange 42 is surrounded by retainer element 22 with an appreciable clearance between the two, and arm 32 is positioned above flange 42. Passageway 50 is axially aligned with a similar passageway 56, the upper end of which forms an orifice centrally located in lower end wall 58 of the enclosed chamber.

As seen in FIG. 3, the chamber is generally divided into three portions, a lower portion 60 between disc 46 and end wall 58, a central portion 62 between disc 46 and the lower surfaces of retainer element 22 and flange 42, and an upper portion 64 between the upper surfaces of the retainer element and flange 42 and upper end wall 66 of the chamber. Refrigerant flowing through device 10 in the direction indicated in FIG. 3 by arrow 68 enters upper chamber portion 64, and may pass through the annular space between flange 42 and retainer member 22 into central chamber portion 62 and thence through grooves 54 into lower chamber portion 60.

As previously mentioned, disc 46 is of a type which snaps back and forth between two distinct positions, i.e., with an "oil-can" effect, in response to changes in temperature. Since the disc is retained in a fixed position at its outer periphery, the movement between the two positions occurs at the center and is transmitted to stem element 36. In one position, disc 46 has a slightly dome-shaped configuration and in the other position, with the center of the disc lower than in the first position, the disc is essentially flat. The elements are shown in FIG. 3a in the first position, i.e., where the center of disc 46 is in its upper position, wherein flange 44 is spaced from end wall 58 of the chamber and refrigerant flow is metered by passageway 56.

When the temperature of the refrigerant contacting disc 46 reaches a predetermined temperature, e.g., 105° F., disc 46 snaps to the second position, lowering the center of the disc and the stem element. The elements are shown in this position in FIG. 3, wherein flange 44 is in firm engagement with chamber end wall 58. Refrigerant flow is then limited to that which passes through passageway 50, which is smaller in diameter than passageway 56. Thus, refrigerant flow is throttled down to a slower rate when refrigerant temperature is at or below a predetermined level, and normal flow is resumed when refrigerant temperature rises to the predetermined level. It is also possible to use a disc which is actuated at one temperature, e.g., 100° F. and reset at a second temperature, e.g., 110° F.

Movement of stem element 36 need be only on the order of a few thousandths of an inch (e.g., 0.012" to 0.015") in many typical applications. The temperature characteristics of disc 46, and the relative dimensions of the elements, flow orifices, etc., may be selected to suit the particular application wherein device 10 is used. Arm 32 contacts the upper surface of flange 42 in the upper position of stem element 36. Nut 34 may be tightened or loosened to vary the pressure exerted by arm 32 on the stem element. In this manner, pressure or tension may be applied to disc 46 in its original (upper) position in order to "fine tune" the temperature at which the disc is actuated.

What is claimed is:

1. A temperature-responsive fluid flow control device comprising:

(a) a body portion defining an enclosed chamber, and inlet and outlet passages or predetermined cross-sectional areas for flow of a fluid into and out of said chamber, respectively;

(b) flow control means positioned within said chamber and movable between first and second positions, wherein flow through said body portion is established through passages of first and second cross sectional areas, respectively, said flow control means comprising an elongated stem member having an axial bore extending therethrough and an end portion movable into and out of engagement with an internal wall of said enclosed chamber when said control means is in said first and second positions, respectively, said end portion being in covering relation to one of said inlet and outlet passages with said axial bore in alignment therewith when in engagement with said internal wall to limit flow through said covered passage to that flowing through said axial bore;

(c) a circular disc positioned within said chamber and movable between two distinct positions with a snap action in response to the temperature of said disc as determined by the temperature of fluid within said chamber, said disc being supported at its periphery in a substantially fixed position, whereby movement of said disc between said two distinct positions occurs at the center of said disc; and (d) means connecting said disc at its center to said flow control means to move said control means between said first and second positions in response to respective movement of said disc between said two distinct positions thereof.

2. The invention according to claim 1 wherein said axial bore has a cross-sectional area less than said predetermined cross-sectional area of said covered passageway.

3. The invention according to claim 2 wherein said covered passage is said outlet passage.

4. A temperature-responsive fluid flow control device comprising:

(a) a body portion defining an enclosed chamber, and inlet and outlet passages of predetermined cross-sectional areas for flow of a fluid into and out of said chamber, respectively;

(b) flow control means positioned within said chamber and movable between first and second positions, wherein flow through said body portion is established through passages of first and second cross-sectional areas, respectively, said flow control means comprising an elongated stem member having opposite end portions and an axial bore of cross-sectional area less than said predetermined cross-sectional area of said outlet passage extending therethrough, one of said end portions being movable into and out of covering relation to said outlet passage when said control means is in said first and second positions, respectively, said axial bore being in alignment with said outlet passage, whereby fluid flow through said outlet passage is limited to that flowing through said bore when said control means is in said first position;

(c) a circular disc positioned within said chamber and movable between two distinct positions with a snap action in response to the temperature of said disc, as determined by the temperature of fluid within said chamber, said disc having an essentially flat configuration in one and slightly dome-shaped configuration in the other of said two distinct positions and being supported at its periphery in a substantially fixed position, whereby movement of said disc between said two distinct positions occurs at the center of said disc;

(d) means connecting said disc at its center to said flow control means to move said control means between said first and second positions in response to respective movement of said actuating means between said two distinct positions thereof; and (e) adjustable biasing means constructed and arranged to exert a force on said disc when the latter is in said dome-shaped configuration, thereby providing a predetermined biasing force tending to move said disc toward said first configuration.

5. The invention according to claim 4 wherein said biasing means comprises an arm having an end portion in contact with the end portion of said stem member opposite said one end portion.

6. A temperature-responsive fluid flow control device comprising:

(a) a body portion defining an enclosed chamber, and inlet and outlet passages of predetermined cross-sectional areas for flow of a fluid into and out of said chamber;

(b) flow control means positioned within said chamber and movable between first and second positions, wherein flow through said body portion is established through passages of first and second cross-sectional areas, respectively, said flow control means comprising an elongated stem member having opposite end portions, said disc being connected at its center to said stem member intermediate of said end portions, (c) a circular disc positioned within said chamber and movable between two distinct positions with a snap action in response to the temperature of said disc, as determined by the temperature of fluid within said chamber, said disc being supported at its periphery in a substantially fixed position, whereby movement of said disc between said two distinct positions occurs at the center of said disc;

(d) means connecting said disc at its center to said flow control means to move said control means between said first and second positions in response to respective movement of said disc between said two distinct positions thereof; and (e) biasing means comprising an arm having a first end fixedly connected with respect to said body portion and a second, free end constructed and arranged to exert a biasing force on said disc when the latter is in one of said two distinct positions, said free end of said arm contacting one of said end portions of said stem member to apply said biasing force to said disc through said stem member.

7. The invention according to claim 6 and further including means for selectively adjusting said biasing force.

8. The invention according to claim 7 wherein said one end of said arm is fixedly connected with respect to said body portion by means of a threaded connection, and said means for selectively adjusting said biasing force comprises the relative degree of tightening of said threaded connection.

9. The invention according to claim 6 and further including an annular retaining element threadedly engaged with said body portion, said disc being supported at its periphery between said retaining element and a shoulder on said body portion within said chamber.

10. The invention according to claim 9 and further including a threaded stud on said retaining element whereon said one end of said arm is retained by a nut.

* * * * *